US008915647B2

(12) United States Patent
Kappler et al.

(10) Patent No.: US 8,915,647 B2
(45) Date of Patent: Dec. 23, 2014

(54) METHOD FOR CORRECTING DETECTOR DATA OF AN X-RAY DETECTOR AND X-RAY RECORDING SYSTEM

(75) Inventors: Steffen Kappler, Effeltrich (DE); Johannes Kippes, Nürnberg (DE); Edgar Kraft, Erlangen (DE); Daniel Niederlöhner, Erlangen (DE); Thomas Reichel, Heroldsbach (DE); Christian Schröter, Bamberg (DE); Thomas Von Der Haar, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 13/426,983

(22) Filed: Mar. 22, 2012

(65) Prior Publication Data

US 2012/0243660 A1    Sep. 27, 2012

(30) Foreign Application Priority Data

Mar. 25, 2011  (DE) .......................... 10 2011 006 154

(51) Int. Cl.
*H05G 1/64* (2006.01)
*G01T 7/00* (2006.01)
*G01T 1/24* (2006.01)

(52) U.S. Cl.
CPC ................ *G01T 1/247* (2013.01); *G01T 7/005* (2013.01)
USPC .............................. 378/207; 378/19; 378/98.8

(58) Field of Classification Search
CPC ................................ G01T 7/005; A61B 6/585
USPC ........................................... 378/19, 98.8, 207
See application file for complete search history.

(56) References Cited

U.S. PATENT DOCUMENTS 5,517,544 A   5/1996  Levinson
7,193,216 B2  3/2007  Kiuru
(Continued)

FOREIGN PATENT DOCUMENTS

CN        1324312 C      7/2007
CN      100477985 C      4/2009
DE    102011006154 A1    8/2012

OTHER PUBLICATIONS

A. Jahnke and R. Matz, Signal formation and decay in CdTe x-ray detectors under intense irradiation, Med. Phys. 26 (1), Jan. 1999, pp. 38-48; Others.

(Continued)

*Primary Examiner* — Glen Kao
(74) *Attorney, Agent, or Firm* — Harness, Dickey & Pierce

(57) ABSTRACT

In a method, with a current measurement, the history of the radiation exposure of the X-ray detector is taken into account with respect to the overall X-ray detector or subareas of the X-ray detector, in respect of a reduction in the measurement sensitivity produced as a result and a recovery of the reduction in the measurement sensitivity, and the determined measuring signal is corrected with a correction factor which is dependent on the history of the radiation exposure. Furthermore, an X-ray recording system includes a detector which includes a plurality of detector elements, which are read out in groups channel by channel and a read-out apparatus with computer-assisted device for correcting read-out detector data prior to a further processing of the detector data to form projective or tomographic images.

20 Claims, 4 Drawing Sheets

(56) References Cited

U.S. PATENT DOCUMENTS

| | | |
|---|---|---|
| 2003/0043957 A1* | 3/2003 | Pelc .................................. 378/4 |
| 2004/0022364 A1* | 2/2004 | Stierstorfer et al. .......... 378/207 |
| 2006/0086906 A1 | 4/2006 | Kiuru |
| 2007/0297562 A1 | 12/2007 | Konno et al. |
| 2010/0193696 A1 | 8/2010 | Blevis et al. |
| 2012/0243660 A1 | 9/2012 | Kappler et al. |

OTHER PUBLICATIONS

German Priority document for German Application No. DE 10 2011 006 154.1, published on Aug. 9, 2012.
German Office Action for German Application No. DE 10 2011 006 154.1, published on Aug. 9, 2012.
Chinese Office Action dated May 13, 2014 for corresponding Chinese Application No. 2012100821771.

* cited by examiner

METHOD FOR CORRECTING DETECTOR DATA OF AN X-RAY DETECTOR AND X-RAY RECORDING SYSTEM

PRIORITY STATEMENT

The present application hereby claims priority under 35 U.S.C. §119 to German patent application number DE 10 2011 006 154.1 filed Mar. 25, 2011, the entire contents of which are hereby incorporated herein by reference.

FIELD

At least one embodiment of the invention generally relates to a method for correcting detector data of an X-ray detector including a plurality of detector elements and groups of detector elements, the detector signals of which are transmitted by way of channels.

At least one embodiment of the invention further generally relates to an X-ray recording system, in particular in a CT system or C-arm system, including a detector comprising a plurality of detector elements, which are read out in groups channel by channel, and a read-out apparatus with computer-assisted devices/modules for correcting read-out detector data prior to a further processing of the detector data to form projective or tomographic images.

BACKGROUND

Solid state detectors are frequently used in computed tomography (CT) and other imaging methods with ionizing radiation. It is generally known that very high demands in respect of sensitivity and linear behavior are placed on such detectors in computed tomography, since minimal deviations in the reconstructed image can already result in significant artifacts.

It has also been known for a long time that the detector material is changed by the incident x-ray radiation and the signal response of these detector materials is thus varied as a function of the history of the absorbed X-ray radiation. It has also been known for a long time that such detector materials indicate recovery effects, so that the behavior approaches an original state again after longer periods of rest. This property, known as radiation drift, may result in artifacts in the CT images, which are nevertheless to be avoided since they may negatively affect the medical diagnosis.

Only detector materials, the radiation drift of which is sufficiently low and homogenous, are therefore used in the prior art. Very high demands are placed here on the selection and quality of the detector material used, which in turn results in high costs for a corresponding detector.

SUMMARY

At least one embodiment of the invention is directed to a method and/or an X-ray recording system which reduces the complicated selection method.

Advantageous developments of the invention form the subject matter of the subordinate claims.

A method is disclosed for correcting detector data of an X-ray detector. In at least one embodiment of the method, with a current measurement, the history of the radiation exposure of the X-ray detector is taken into account with respect to the overall X-ray detector or subareas of the X-ray detector, in respect of a reduction in the measurement sensitivity produced as a result and a recovery of the reduction in the measurement sensitivity, and the determined measuring signal is corrected with a correction factor which is dependent on the history of the radiation exposure.

Furthermore, an X-ray recording system is disclosed, in particular a CT system or C-arm system. In at least one embodiment, the system includes a detector which includes a plurality of detector elements, which are read out in groups channel by channel and a read-out apparatus with computer-assisted device for correcting read-out detector data prior to a further processing of the detector data to form projective or tomographic images, wherein the computer-assisted device includes a memory, in which program code is stored, which executes the described method during operation.

BRIEF DESCRIPTION OF THE DRAWINGS

Embodiments of the invention are described in more detail below with the aid of the figures, wherein only the features needed to understand the invention are shown. The following reference characters are used: 1: course of the drift during irradiation; 2: course of the drift during irradiation pauses; 3: course of the drift during combined irradiation and irradiation pauses; C1: CT system/C-arm system; C2: first X-ray tube; C3: first detector; C4: second X-ray tube; C5: second detector; C6: gantry housing/drive system; C7: C-arm; C8: patient couch; C9: system axis; C10: regulating and control unit; Prg1-Prgn: computer programs; S1-S5: repeating method steps; S/S0: relative signal behavior; t: time, in which, in detail.

DETAILED DESCRIPTION OF THE EXAMPLE EMBODIMENTS

Figure 1:
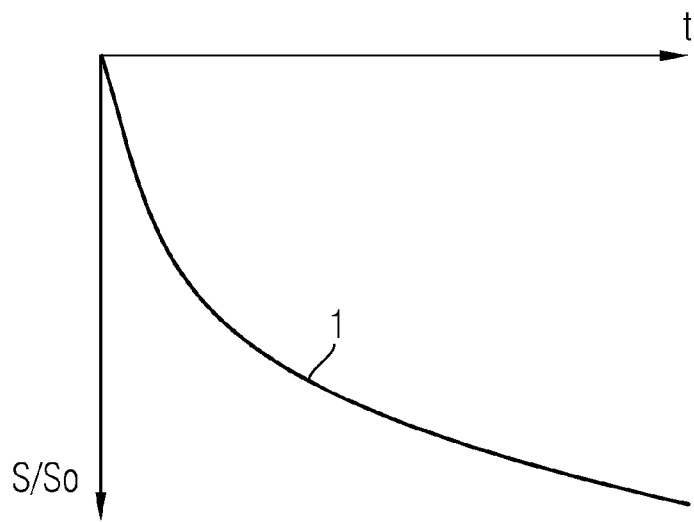
FIG. 1: shows the course of the drift during irradiation.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The inventors have identified that this complicated selection method can be drastically reduced and currently existing restrictions in terms of the detector material used on account of the hitherto necessary homogenous behavior of the detector material can also be largely eliminated, if is possible to assess the detector material used in as pixel specific a fashion as possible with respect to its history relating to the applied radiation deposition and the historically run damping behavior and to predict therefrom the change in the dose response behavior.

The radiation drift behavior generally depends not only on the total quantity of the absorbed X-ray radiation, but also on the intensity with which the detector was irradiated. One cause of the drift may be in particular polarization effects and the damping behavior thereof in direct-converting materials, such as for instance CdTe or CdZnTe.

It is therefore proposed, in an embodiment, to detect the history of the incident X-ray radiation for each detector element and to correct the behavior of the signal output for the respective next measurement with the aid of a mathematical model such that the signal drift which essentially still exists is corrected. Such a correction can on the one hand be executed by way of the overall detector or up to the pixel plane. With these corrections, drift-dependent artifacts are largely avoided.

The drift behavior can basically depend in a complex fashion on a large number of parameters, in particular the temporal influence, for instance by reproducing a time-dependent recovery behavior of the detector material, should also be taken into account here.

A possible model is subsequently described herefor:

According to a simple model, it can be assumed herefrom that the drift is caused by polarization of the detector material. Such polarization is established by the X-ray radiation and is restricted by a maximum value, which is achieved with a continuously strong X-ray radiation. After the end of the irradiation, the polarization breaks down again, e.g. exponentially with one or several time constants. The precise behavior of the detector channel is dependent on material and must be determined experimentally.

The drift D during a scan is generally a function f which depends on irradiations B(N) preceding the N: D=fB(B(N))

If the drift is known, the detector signal can herewith be corrected: Icorr=Imeas×fD(D)

The functions fB and fD are for instance to be determined experimentally for each channel if not all measuring channels behave comparably. fB and fD can depend on a series of radiation parameters, e.g. on:
 the duration of the irradiation (DB);
 the intensity of the irradiation (IB);
 the spectral composition of the radiation (SB);
 duration of irradiation pauses (DP).

In accordance with at least one embodiment of the invention, the detector measures and stores the incident X-ray radiation, in particular the duration DB and intensity IB of the irradiation. Depending on the detector type, the spectral composition SB can also be measured by the detector itself or by means of other information, such as the adjusted acceleration voltage, the known filtering of the X-ray tubes.

The irradiation history B(BD(N), IB(N), SB(N), DP(N), . . . ) can be determined continuously and the drift D can be determined continuously with the aid of the function f(B(N)). In the simplest case, the drift D is a number which describes the drift state of the material in a one-dimensional fashion. In more complex cases, the drift state must be described with several parameters Dn. This is determined in a material-dependent and experimental fashion.

The clinical measuring processes appear so that generally 1 to 5 scans of 1 to 40 seconds are implemented and scan pauses of several minutes are then inserted in order to prepare for a new patient on the device. The radiation drift builds up in the second range with the majority of materials, the breakdown extends past minutes to hours. It is therefore necessary to allow both the irradiation times and also the irradiation pauses over several hours to influence the calculation of the drift.

In the simplest case, only the drift existing prior to the scan must be taken into account for correction purposes. If this is not sufficient, the drift induced during the scan itself can likewise be taken into account for this scan. The correction for each individual measuring channel should advantageously be implemented, since each measuring channel comprises a different irradiation history. At the same time, the drift state for each channel can be updated on the basis of the irradiation parameter of the current scan for the momentary drift state.

According to this afore-described knowledge, the inventors propose a method, in an embodiment, for correcting detector data of an X-ray detector, wherein in accordance with an embodiment of the invention with a current measurement, the history of the radiation exposure of the X-ray detector is taken into account with respect to the overall X-ray detector or to subareas of the X-ray detector, in respect of a reduction of the measurement sensitivity produced as a result and a recovery of the reduction of the measurement sensitivity, and the determined measuring signal is corrected with a correction factor which is dependent on the history of the radiation exposure.

Advantageously the correction factor can therefore also be dependent at least on the duration of the irradiation (DB) and/or on the intensity of the irradiation (IB) and/or on the spectral composition of the irradiation (SB) and/or on the duration of the irradiation pauses (DP) of the overall X-ray detector or subareas of the X-ray detector.

Furthermore, the radiation exposures occurring during the current scan can also be determined and influence the calculation of the respective current correction factor.

It is finally proposed during the calculation of the correction factor to assume a reciprocal exponential behavior of the detector material with respect to the reduction in the signal response to an X-ray signal. For instance, the reduction A(Dj) in the detector signal can be described as a function of the respectively applied dose Dj:

$$A(D_j) = c_1 \cdot e^{-\frac{D_j}{c_2}} + c_3,$$

where c1 to c3 represent empirically determined constants and Dj represents the respectively applied dose.

Furthermore, an exponential behavior of the detector material with respect to the gradual recovery of the signal response to an X-ray signal can be assumed. Such a behavior can be described for instance with the recovery factor $$E(t) = 1 - e^{-\frac{t}{k1}},$$

where t corresponds to the time and k1 to a time constant.

It is particularly advantageous if the exponential behavior of the detector material is expressed with respect to the gradual recovery of the signal response to an X-ray by the total of at least two exponential functions with different time constants. A corresponding recovery function can read for instance $$E(t) = \alpha\left(1 - e^{-\frac{t}{k_1}}\right) + \beta\left(1 - e^{-\frac{t}{k_2}}\right),$$

where k1 and k2 represent time constants and α and β represent weighting factors which total 1.

Aside from the afore-described method, in at least one embodiment the inventors also propose an X-ray recording system, in particular in a CT system or C-arm system, having a detector which comprises a plurality of detector elements, which are read out in groups channel by channel and a read-out apparatus with computer-assisted device/module for correcting read-out detector data prior to a further processing of the detector data to form projective or tomographic images, wherein the computer-assisted device/module include a memory, in which a program code is stored, which executes at least one embodiment of the inventive method during operation.

FIG. 1 shows a signal behavior of a detector material shown by way of example with a continuous dose. The time t is plotted on the x-coordinate, which is also proportional here to the applied dose on account of the irradiations of the detector which are implemented with the same dose at the same intervals. The course 1 of the relative signal behavior of the detector S/S0 which corresponds to a drift is plotted on the y-coordinate, where S represents the current signal response to a specific dose rate and S0 represents the initial signal response to this dose rate.

Figure 2:
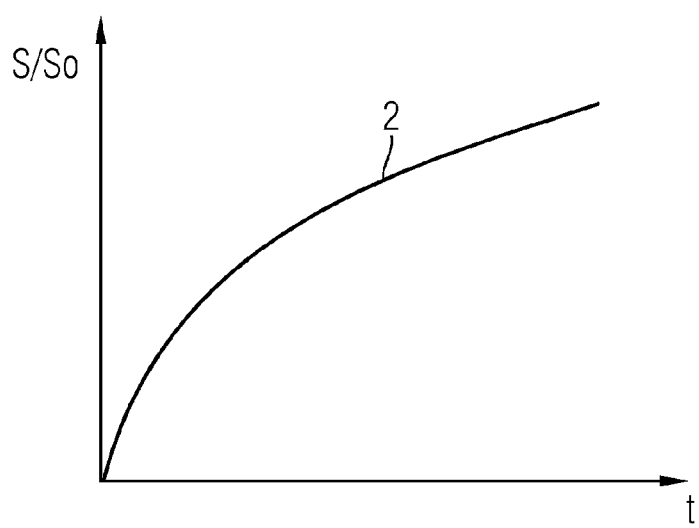
FIG. 2: shows the course of the drift during irradiation pauses.

FIG. 2 shows the course 2 of this relative signal behavior S/S0 of the same detector over the recovery time t.

Figure 3:
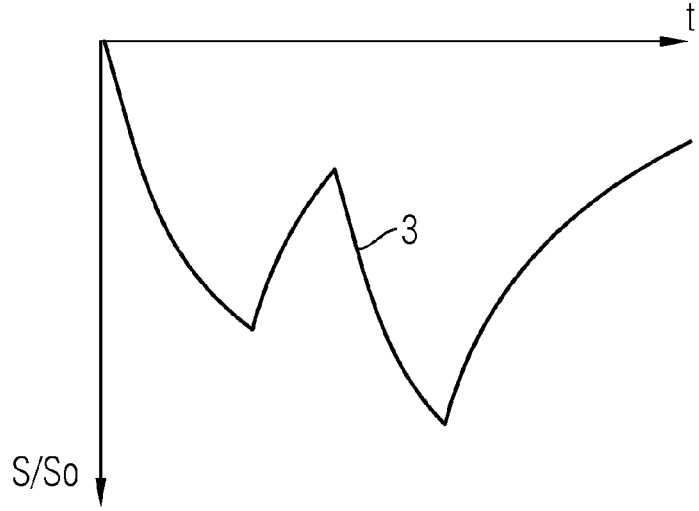
FIG. 3: shows the course of the drift during combined irradiation and irradiation pauses.

If irradiations and irradiation pauses now take place one after the other, a drift behavior of the detector results, as is shown with the curve 3 in FIG. 3. Accordingly, the current correction factor to be used to correct the measuring signal can be used with each measurement on the basis of the knowledge of the history of the detector with respect to its exposures and recovery phases.

Figure 4:
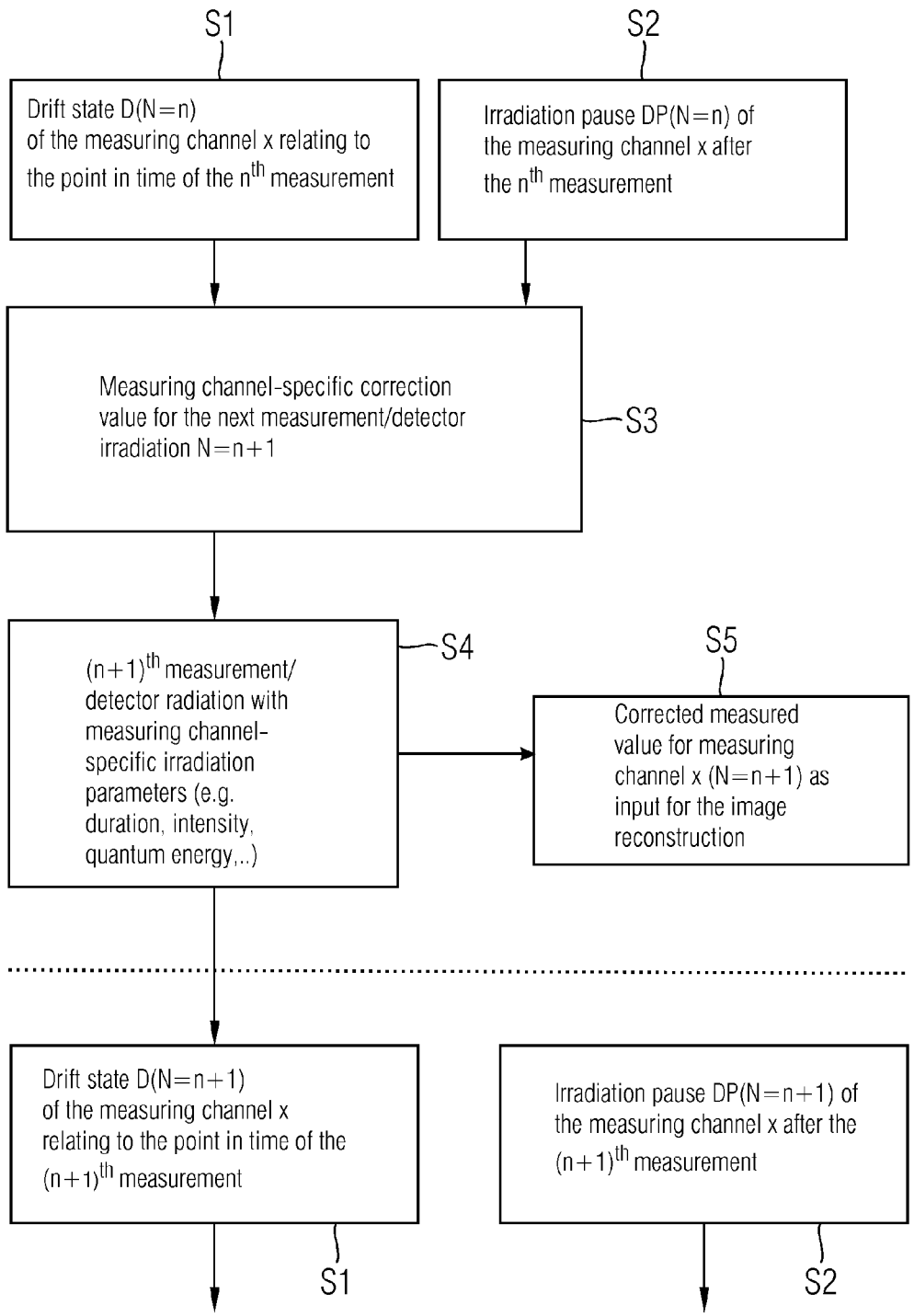
FIG. 4: shows a schematic representation of an embodiment of the inventive method.

A simple example of a correction sequence is shown in FIG. 4. Here the drift state of the detector material D(N=n) is determined in step 1 with respect to a measuring channel of the detector in two input steps S1 and S2 based on the known history of the detector material on the one hand, where N represents the number of irradiations with a predetermined dose and n represents the current number of effected irradiations.

At the same time, the recovery is determined on account of the currently occurring irradiation pause DP(N=n) according to the nth measurement. A measuring channel-specific correction value for the next measurement and/or detector irradiation N=n+1 is calculated herefrom with the empirically determined approximation functions in step S3. In step S4, the current measurement with the number N=n+1 now takes place by storing the measuring channel-specific irradiation parameters, such as for instance the duration, the radiation intensity, the overall dose, the spectral distribution, in order to be taken into account during the next measurement. The measured values are then corrected in a channel-specific fashion on the basis of the previously determined correction factor and this corrected value in step S5 is routed to the image reconstruction.

The method is then repeated, starting with steps S1 and S2, wherein the input values have changed accordingly by means of the currently implemented n+1th measurement and if necessary an n+1th irradiation pause present.

Figure 5:
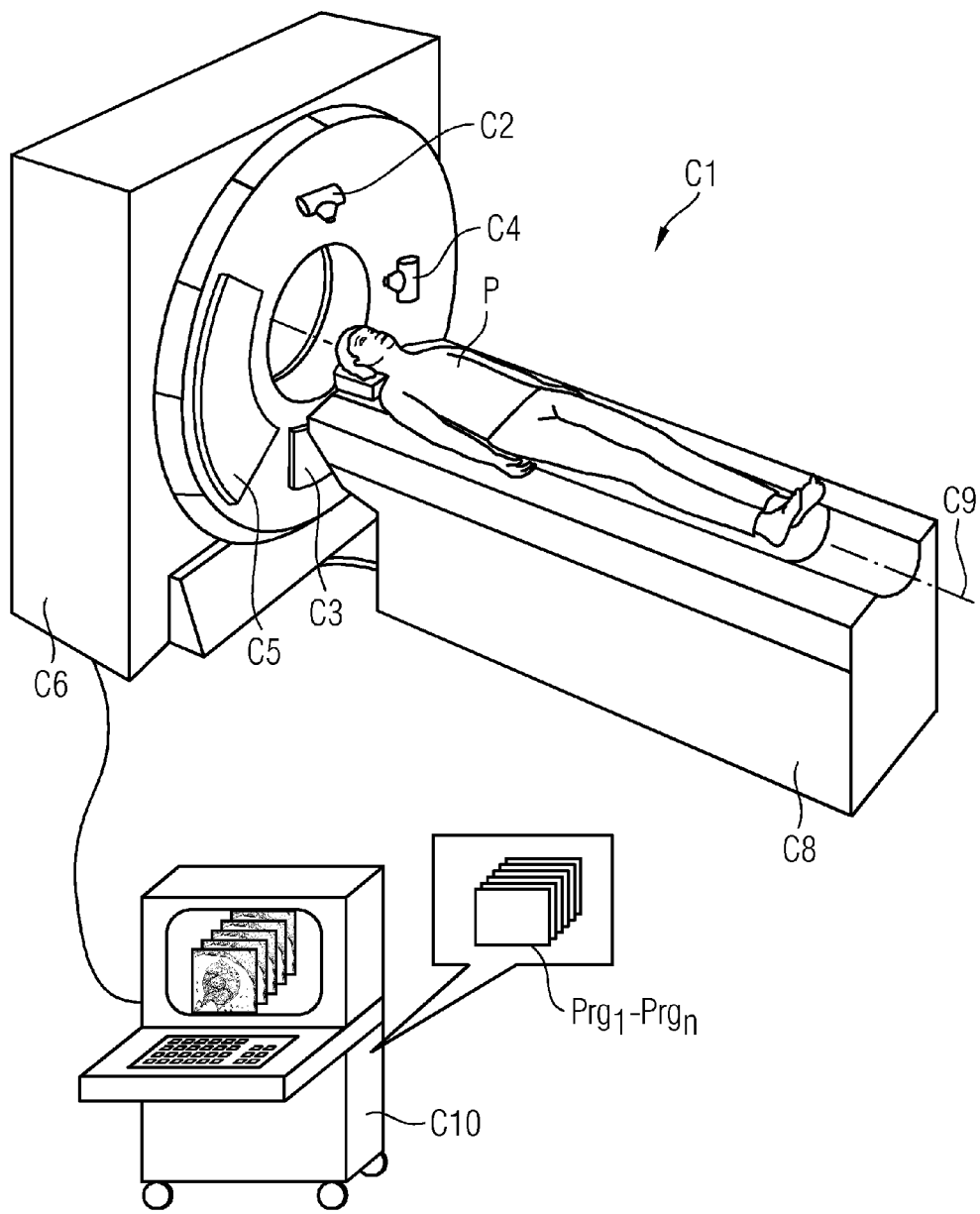
FIG. 5: shows a CT system for implementing an embodiment of the inventive method.

By way of example FIG. 5 shows a CT system C1, in which the inventive method can be implemented with respect to the detector correction. The CT system C1 consists of a gantry housing C6, in which a first tube/detector system, consisting of a first X-ray tube XC2 and an opposing first detector C3, are located on the gantry. Optionally, a further tube/detector system can be provided, consisting of the second X-ray tube C4 and the opposite second detector C5. Both tube/detector systems can rotate about a measuring field during the scanning, which is described here by an opening in the gantry housing C6, while a patient P on a movable patient couch C8 is moved along a system axis C9 through the measuring field. The patient P can herewith be moved both continuously and also sequentially. Furthermore, with an examination of a specific region, this specific region of the patient can be exclusively brought into the measuring field, wherein it is then paused in a stationary fashion during the scanning process.

The control of the CT system C1 is taken over by a regulating and control unit C10, which comprises a memory with computer programs Prg1 to Prgn, in which the necessary method for controlling the CT system and for evaluating the received detector data, including the reconstruction of corresponding image data, are stored. An embodiment of the inventive method for correcting the received detector data can likewise be encoded in a computer program and implemented in a program memory of the control and regulation unit C10, in other words a computing unit, so that this method is processed during operation of the system.

Figure 6:
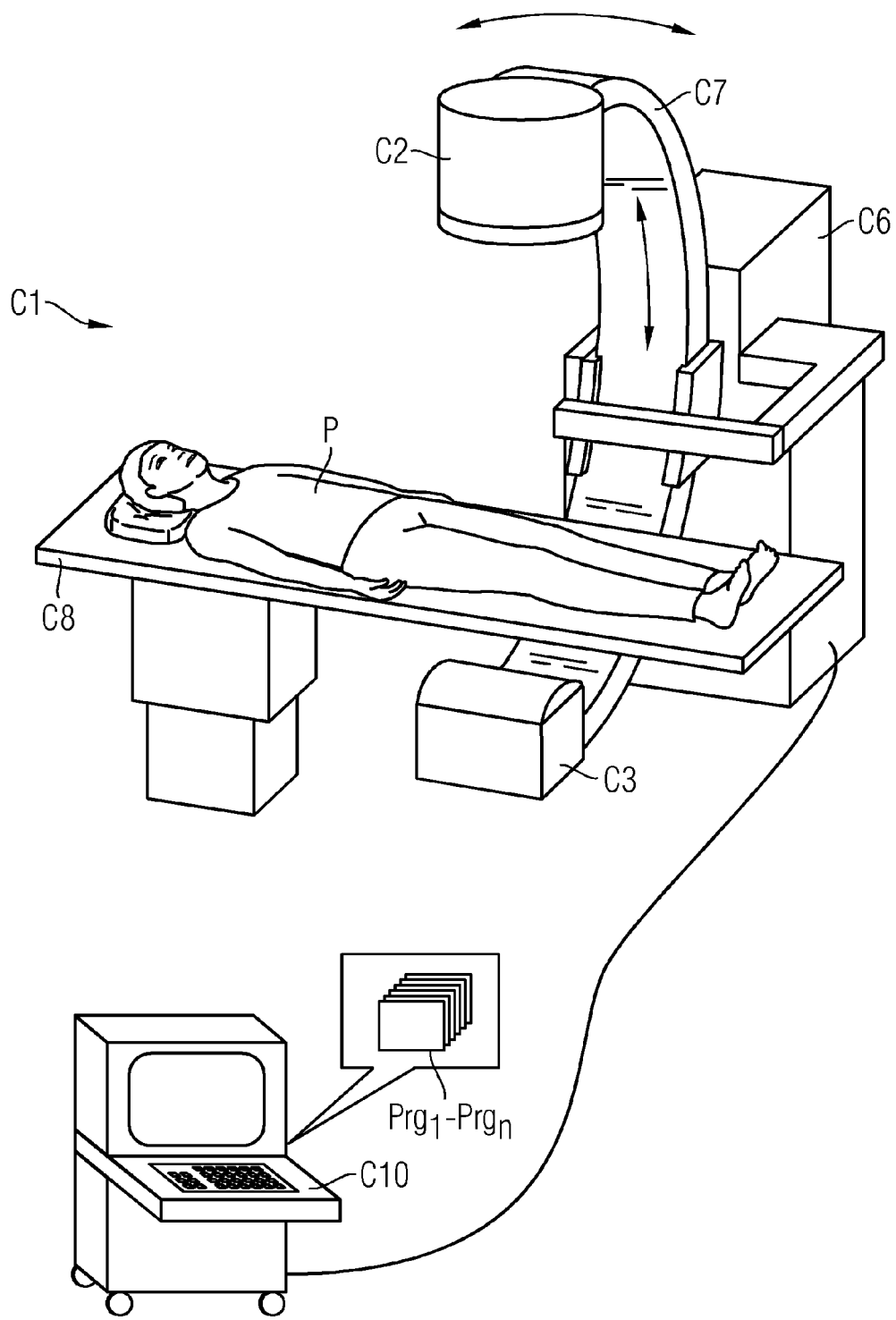
FIG. 6: shows a C-arm system for implementing an embodiment of the inventive method.

FIG. 6 likewise shows a CT system in the form of a C-arm system C1, which comprises a C-arm C7, at the end of which an X-ray tube C2 with an opposing detector C3 is located. This C-arm C7 can be moved rotationally around a patient P on a patient couch C8 with the aid of the drive system C6. On account of the design of the C-arm system 1, the patient P is more easily accessible during the examination.

The regulation and control of the C-arm system C1 is executed by a regulation and control unit C10, which comprises computer programs Prg1 t0 Prgn, wherein program code can also be provided here in the memory of this regulation and control unit, which implements the inventive method during operation and corrects the detector data accordingly.

It is proposed overall with an embodiment of the invention to take the history of the radiation exposure of the X-ray detector, with respect to the overall X-ray detector or subareas of the X-ray detector, with respect to a reduction in the measurement sensitivity produced as a result and a recovery of the reduction in the measuring sensitivity into account with a current radiation measurement with the aid of an X-ray detector, and to correct the determined measuring signal with a factor which is dependent on the history of the radiation exposure.

It is evident that the afore-cited features of the invention can not only be used in the respectively specific combination, but also in other combinations or alone, without departing from the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for correcting detector data of an X-ray detector, comprising:
   obtaining, with a current measurement, a history of radiation exposure of the X-ray detector, with respect to the X-ray detector or subareas of the X-ray detector, the history of radiation reflecting a reduction in a measurement sensitivity of the detector and a recovery of the reduction in the measuring sensitivity; and
   correcting the detector data with a correction factor, the correction factor being based on the history of the radiation exposure and radiation exposures during the current measurement.

2. The method as claimed in claim 1, wherein the correction factor is further based on a duration of irradiation of the X-ray detector or subareas of the X-ray detector.

3. The method as claimed in claim 2, wherein the correction factor is further based on an intensity of irradiation of the X-ray detector or the subareas of the X-ray detector.

4. The method as claimed in claim 2, wherein the correction factor is further based on a spectral composition of irradiation of the X-ray detector or of the subareas of the X-ray detector.

5. The method as claimed in claim 2, wherein the correction factor is further based on a duration of irradiation pauses of the X-ray detector or the subareas of the X-ray detector.

6. The method as claimed in claim 1, wherein the correction factor is further based on an intensity of irradiation of the X-ray detector or the subareas of the X-ray detector.

7. The method as claimed in claim 1, wherein the correction factor is further based on a spectral composition of irradiation of the X-ray detector or of the subareas of the X-ray detector.

8. The method as claimed in claim 1, wherein the correction factor is further based on a duration of irradiation pauses of the X-ray detector or the subareas of the X-ray detector.

9. The method as claimed in claim 1, further comprising:
   determining the correction factor using a reciprocal exponential function, the reciprocal exponential function reflecting a weakening of a signal response to an X-ray signal.

10. The method of claim 9, wherein the weakening of the signal response is determined based on the following formula, $$A(D_j) = c_1 \cdot e^{-\frac{D_j}{c_2}} + c_3$$

wherein $D_j$ is a respectively applied dosage of the X-ray signal and $c_1$ to $c_3$ represent empirically determined constants.

11. The method as claimed in claim 1, further comprising: determining the correction factor using an exponential function, the exponential function reflecting a recovery of a signal response to an X-ray signal.

12. The method as claimed in claim 11, wherein the exponential function is a sum of at least two exponential functions with different time constants.

13. The method of claim 12, wherein the exponential function is represented by the following formula, $$E(t) = \alpha\left(1 - e^{-\frac{t}{k_1}}\right) + \beta\left(1 - e^{-\frac{t}{k_2}}\right)$$

wherein $k_1$ and $k_2$ are time constants and $\alpha$ and $\beta$ represent weighting factors the sum of which is 1.

14. The method of claim 11, wherein the exponential function is represented by the following formula, $$E(t) = 1 - e^{-\frac{t}{k_1}}$$

wherein t represents time and $k_1$ is a time constant.

15. The method as claimed in claim 1, wherein the obtaining and the correcting are implemented channel by channel.

16. The method as claimed in claim 1, wherein the obtaining and the correcting are implemented pixel by pixel.

17. A non-transitory computer readable medium including a computer program product, the computer program product comprising instructions, which when executed on a computer device causes the computer device to implement the method of claim 1.

18. An X-ray recording system, comprising:
an X-ray detector, including
 a plurality of detector elements, configured to be read out in groups channel by channel, and
 a read-out apparatus including a computer-assisted device to correct read-out detector data prior to a further processing of the detector data to form projective or tomographic images, the computer-assisted device including a memory, in which a computer program product is stored, the program being configured to,
obtain, with a current measurement, a history of radiation exposure of the X-ray detector, with respect to the X-ray detector or subareas of the X-ray detector, the history of radiation reflecting a reduction in a measurement sensitivity of the detector and a recovery of the reduction in the measuring sensitivity, and
correct the detector data with a correction factor, the correction factor being based on the history of the radiation exposure and radiation exposures during the current measurement.

19. The X-ray recording system of claim 18, wherein the X-ray recording system is a CT system.

20. The X-ray recording system of claim 18, wherein the X-ray recording system is a C-arm system.

* * * * *